Dec. 3, 1935.  G. A. SHAFFER ET AL  2,023,152
CAP FORMING MACHINE
Filed June 27, 1933  16 Sheets-Sheet 4

INVENTORS.
GLENN A. SHAFFER
FRANKLIN H. WIRTZ
BY
ATTORNEY.

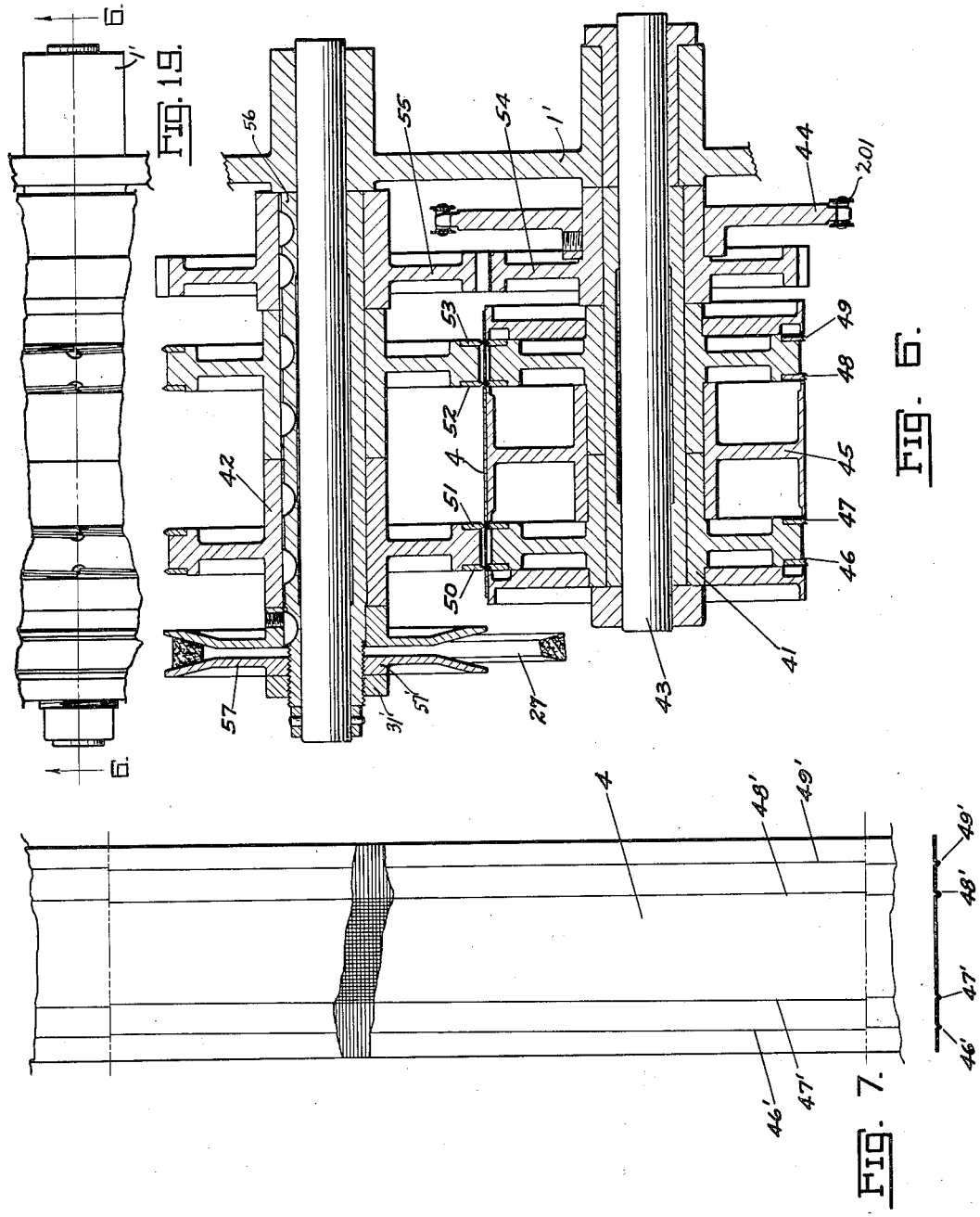

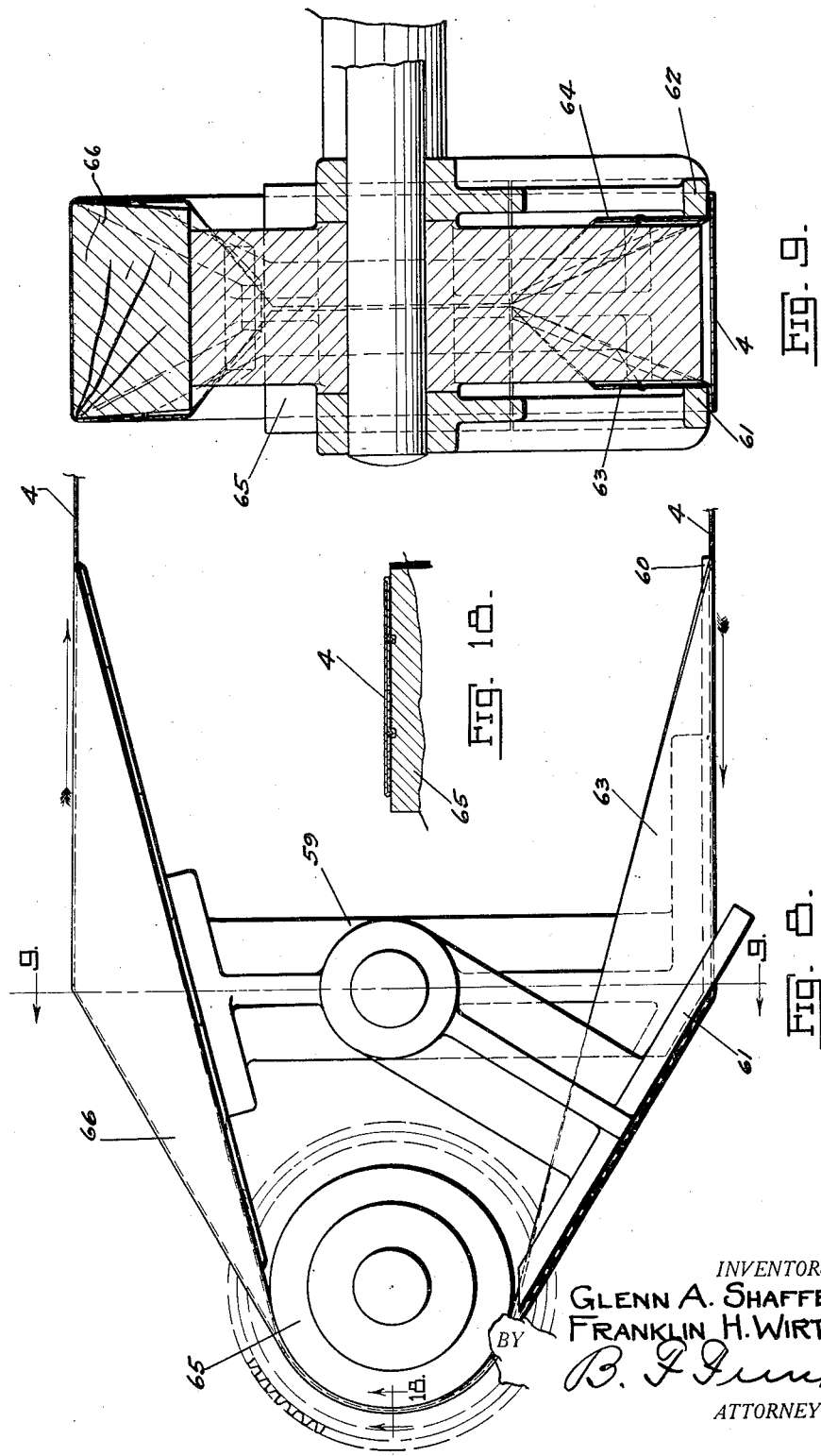

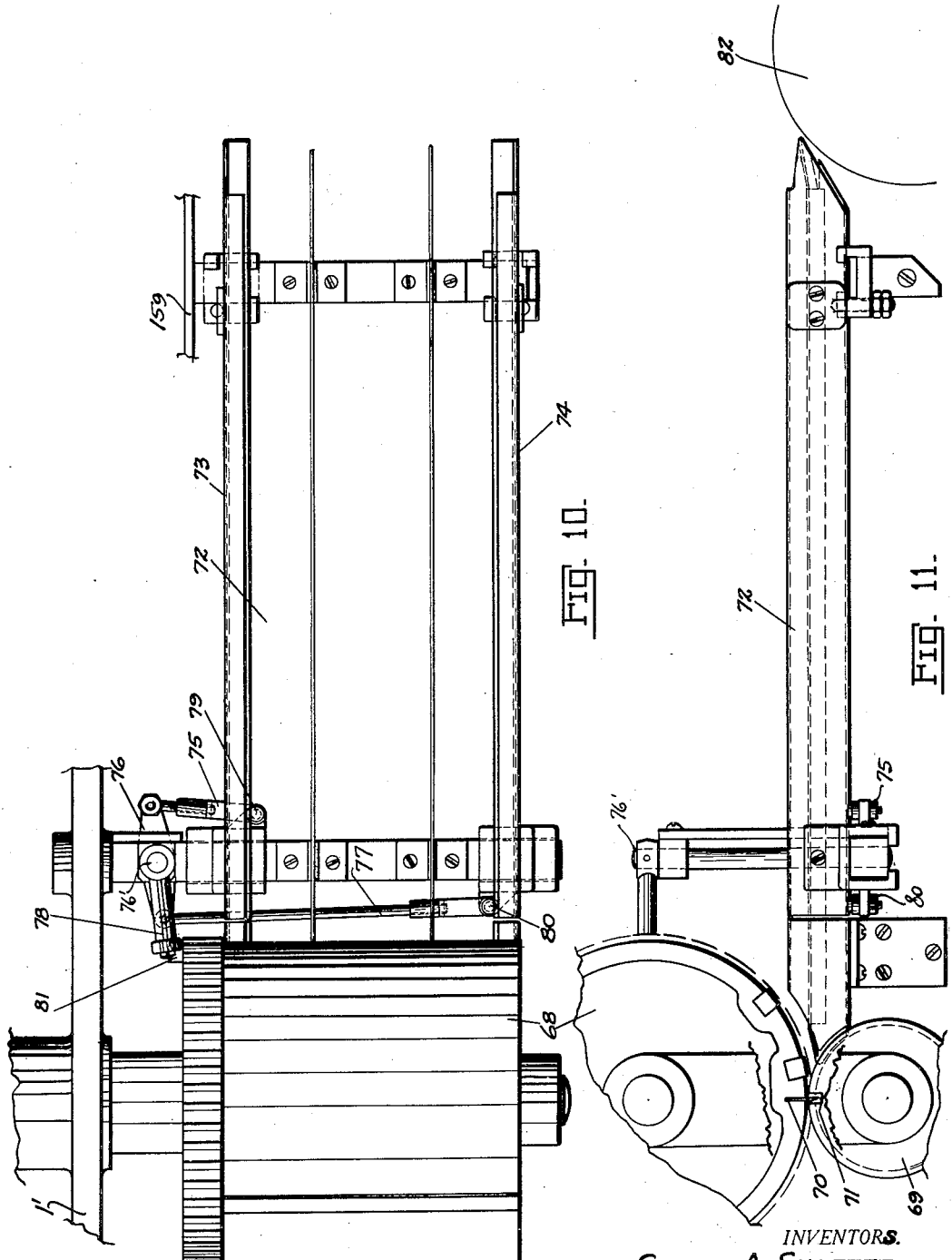

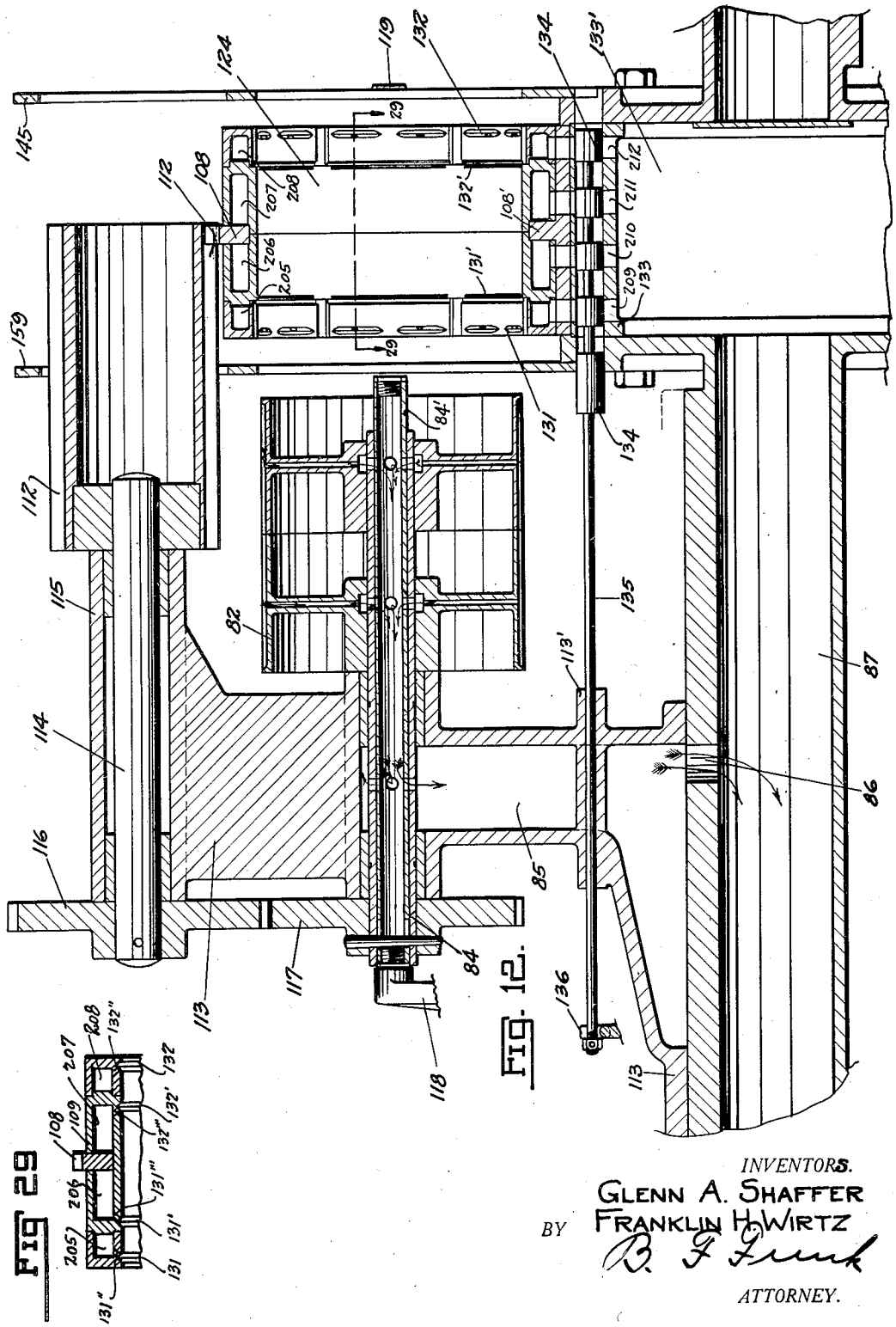

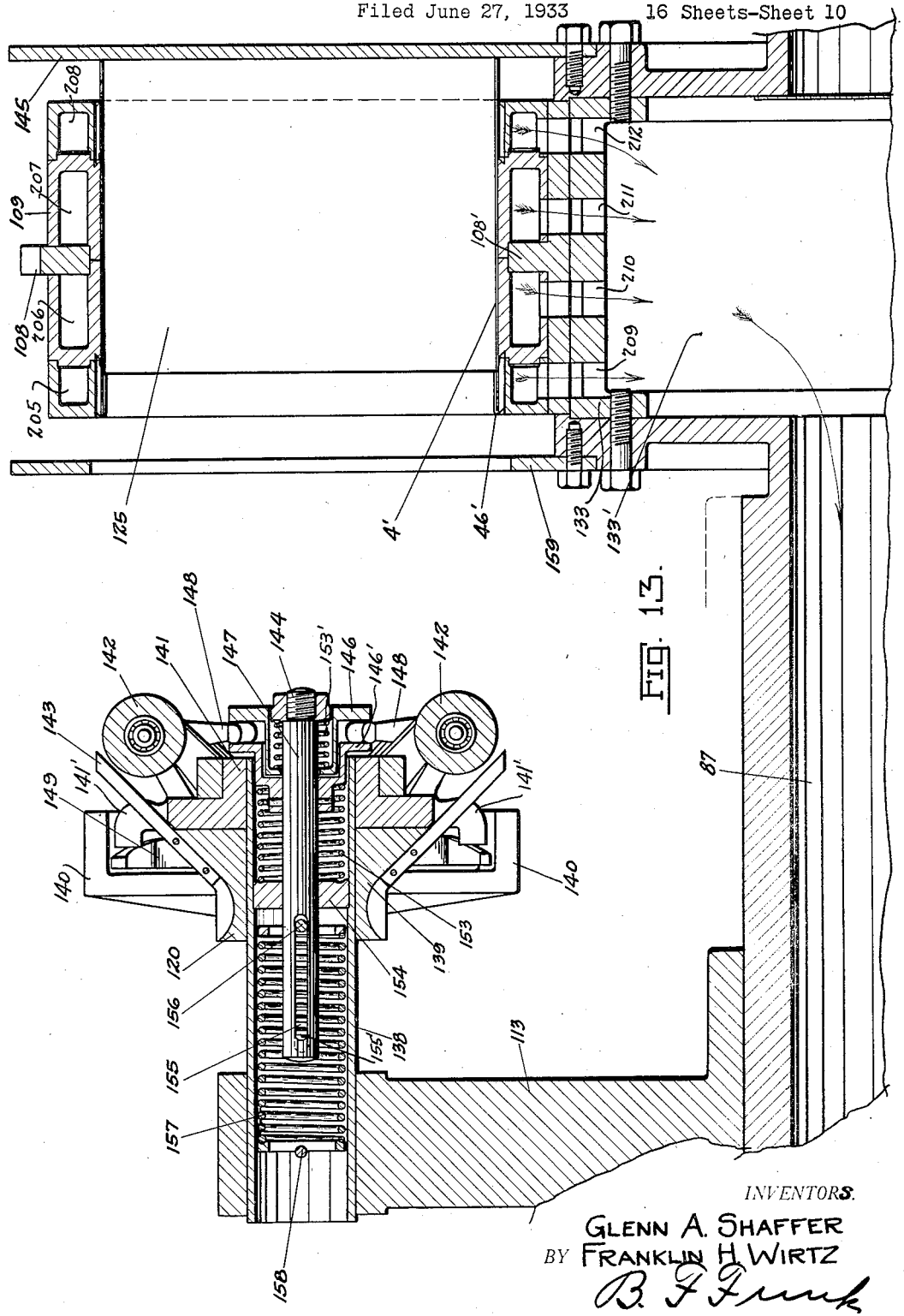

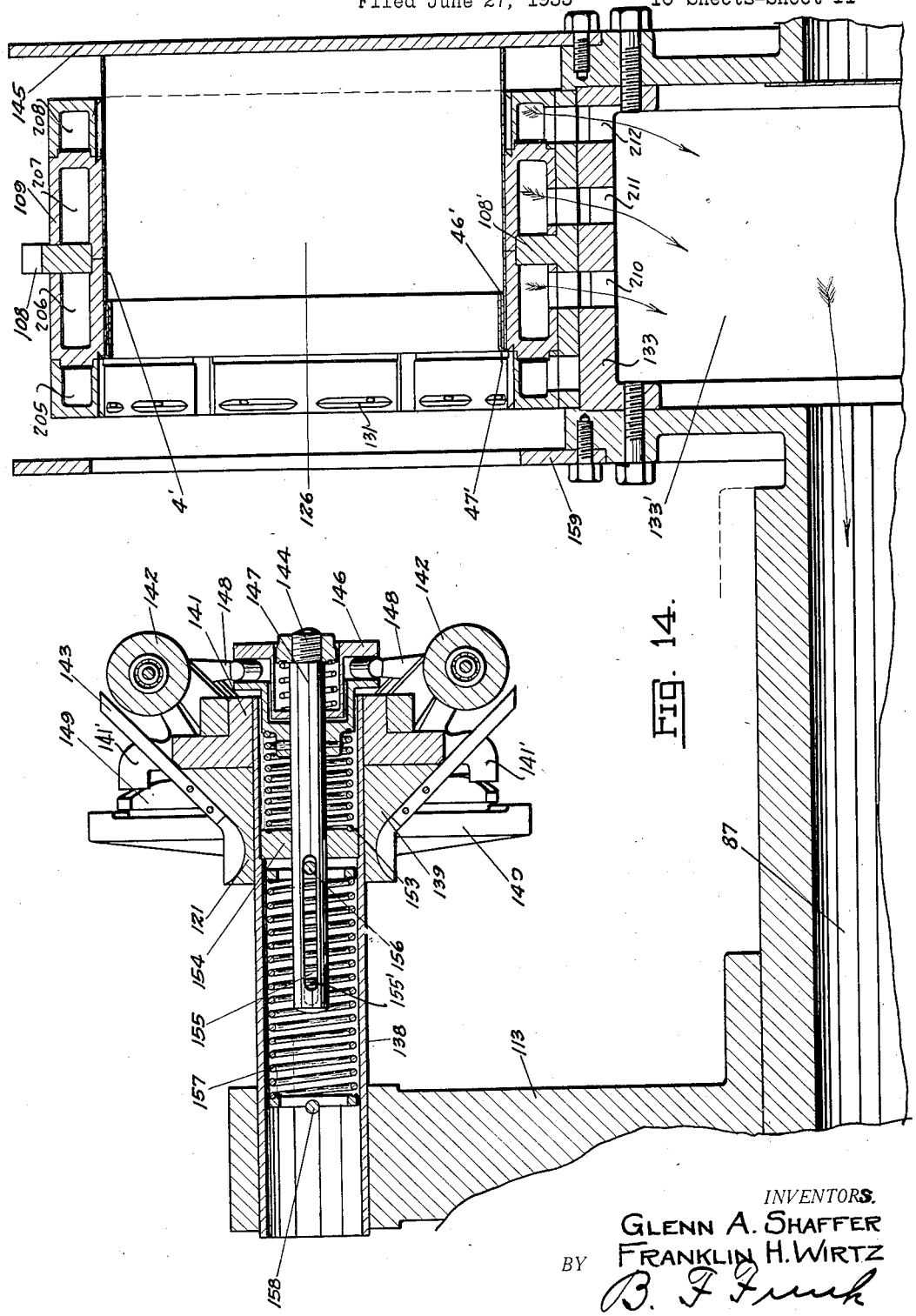

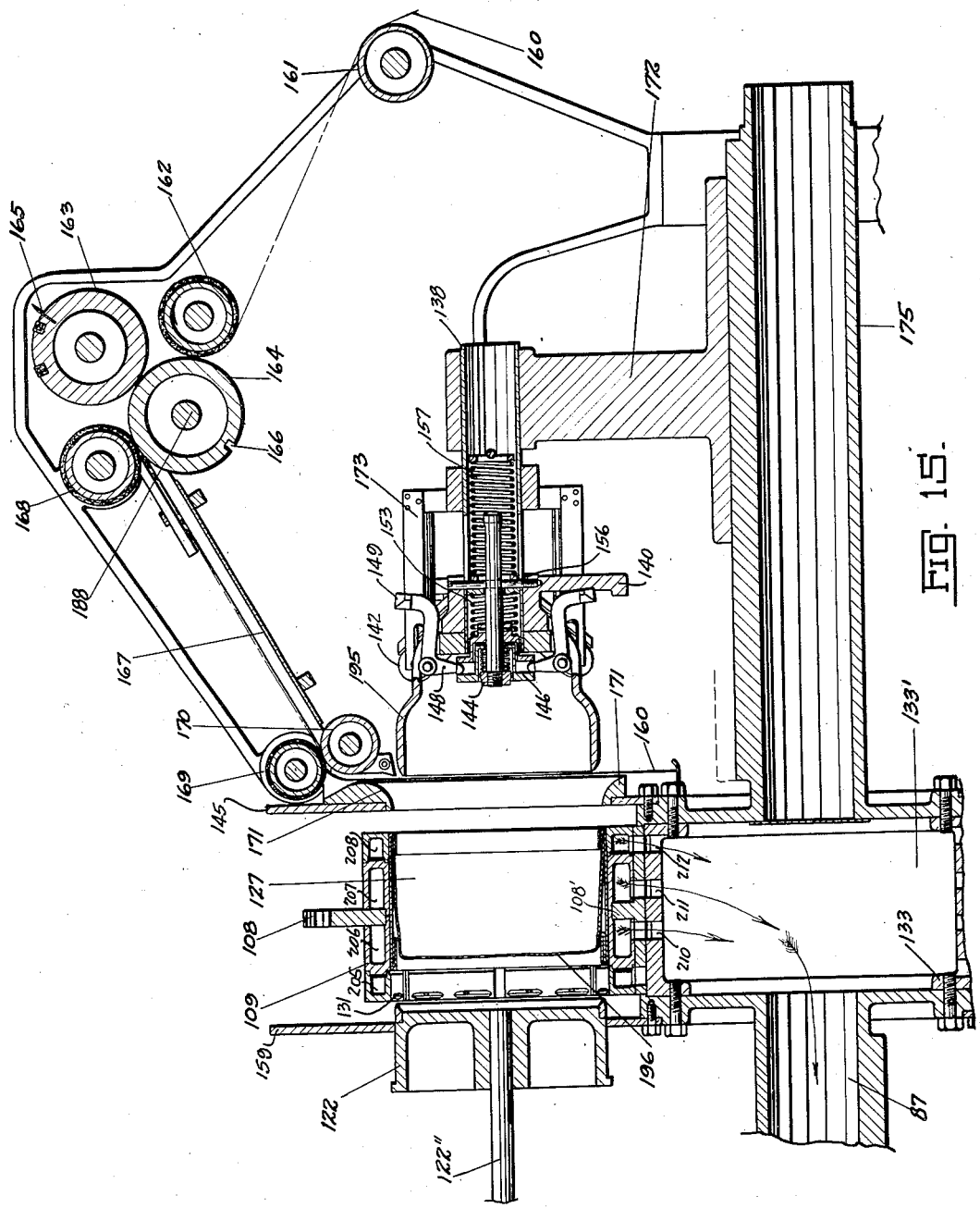

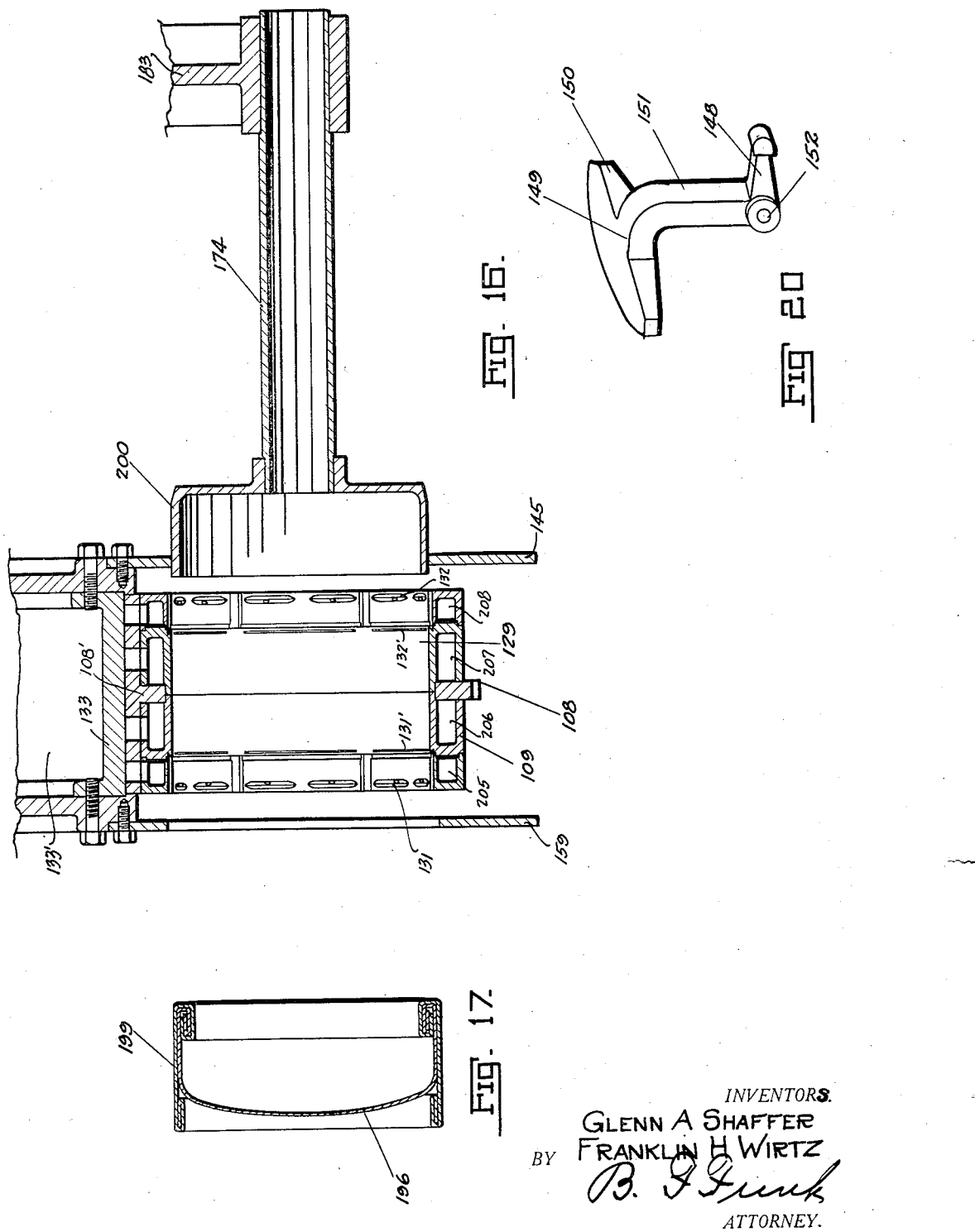

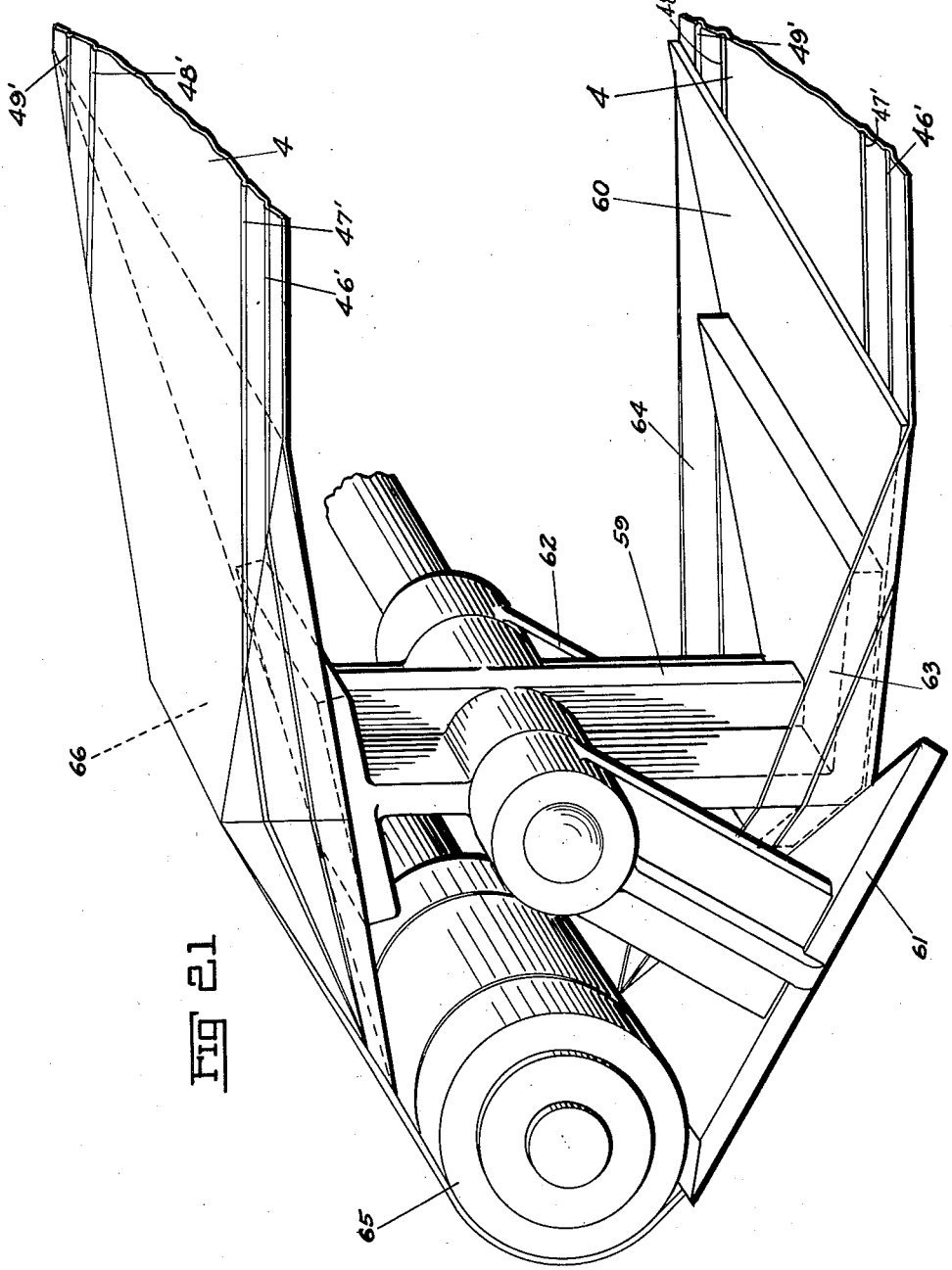

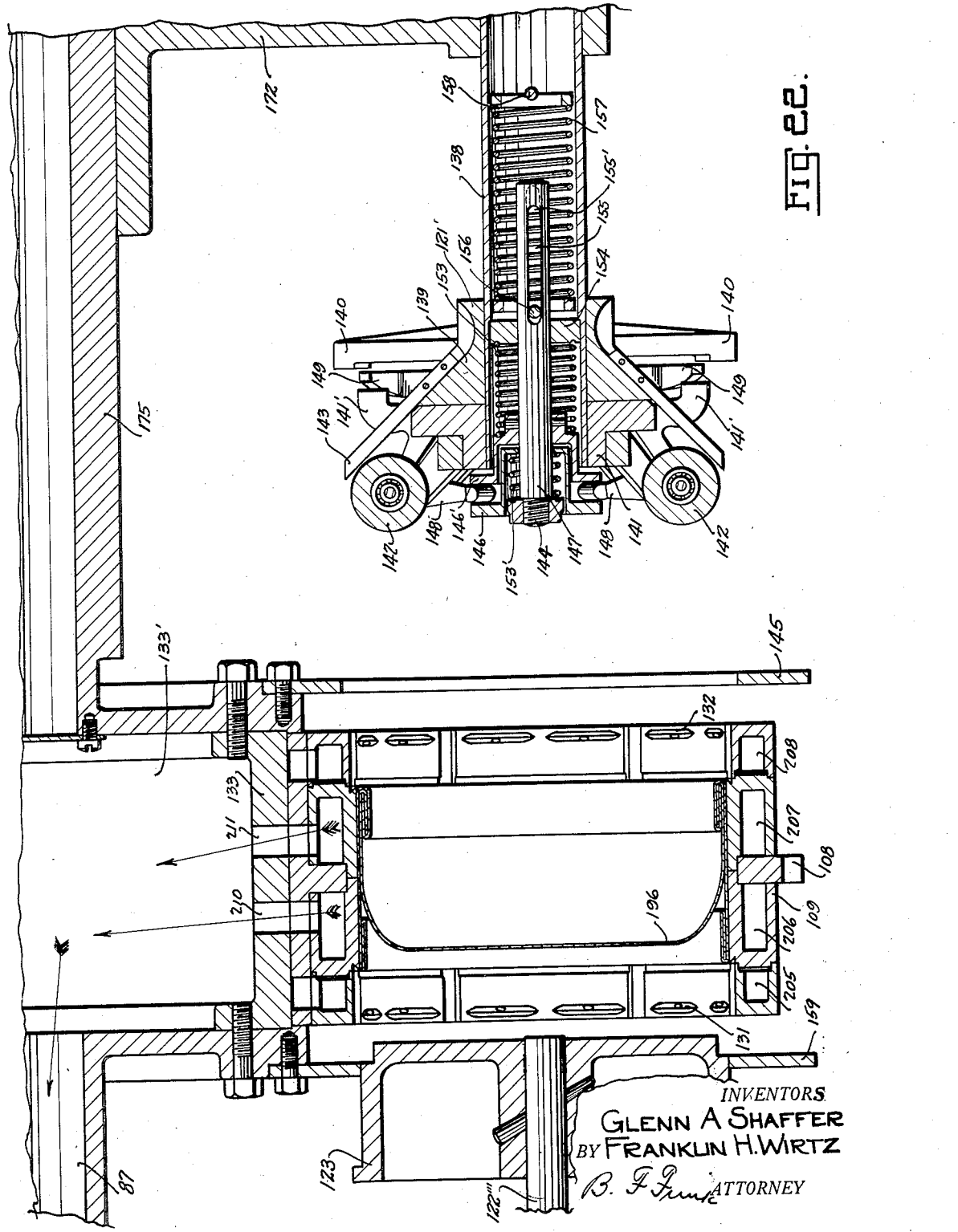

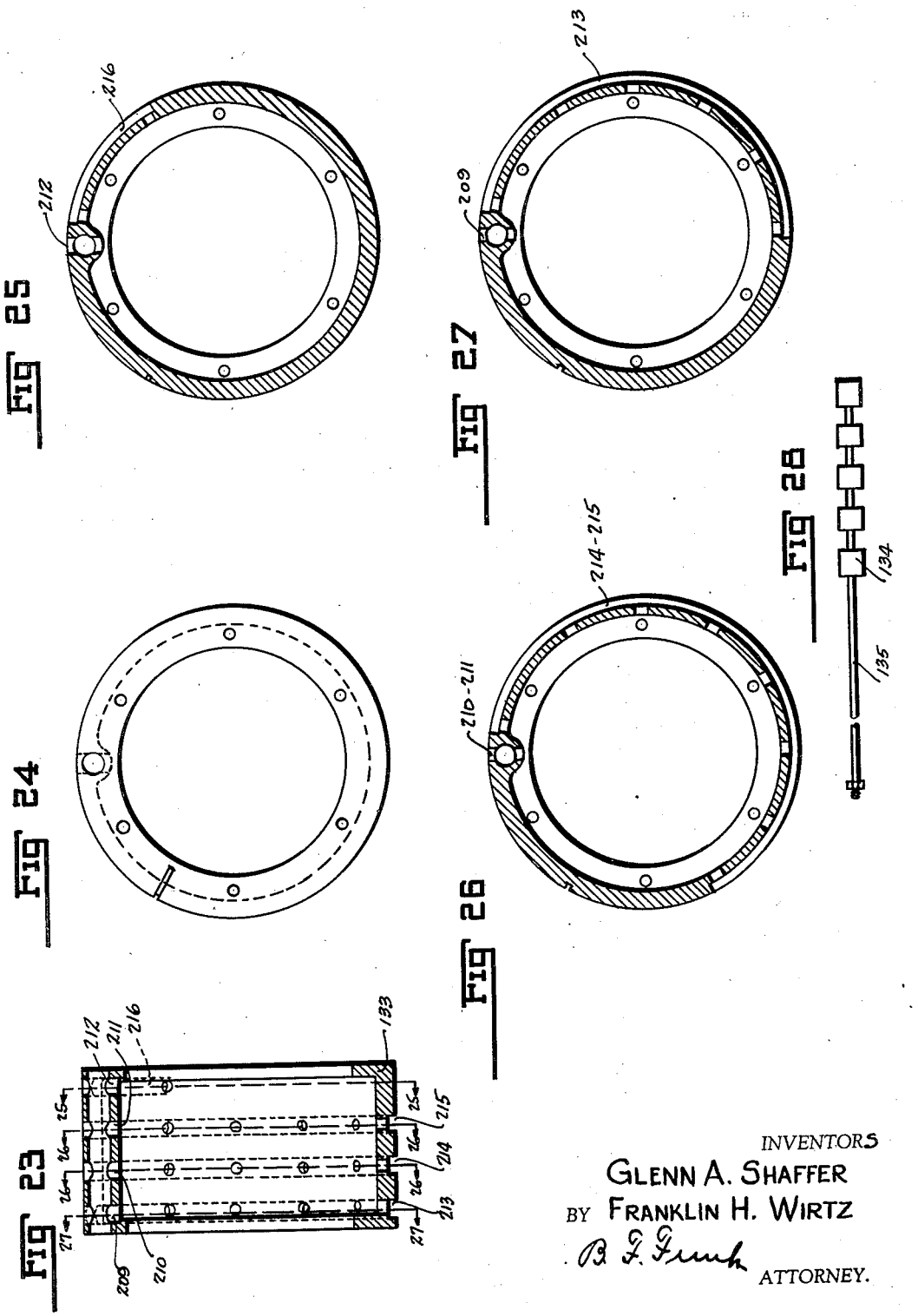

Patented Dec. 3, 1935

2,023,152

UNITED STATES PATENT OFFICE 2,023,152

CAP FORMING MACHINE

Glenn A. Shaffer and Franklin H. Wirtz, Green Bay, Wis., assignors to The White Castle System of Eating Houses Corporation, Wichita, Kans., a corporation of Kansas Application June 27, 1933, Serial No. 677,866

16 Claims. (Cl. 223—7)

This invention relates to machines for making head coverings such as caps and the like. The machine is particularly adapted for use in the manufacture of paper caps but it is not necessarily limited to use on any particular material. In actual practice we have found that an all paper cap can be manufactured having the same general appearance as a cloth or linen cap and at such small cost that the actual retail price of the cap is considerably less than the cost of laundering the ordinary fabric cap.

The caps made by the illustrated machine consist of a crown and a band or brim. The band or brim can be fabricated from a roll of paper to give it a stiffening edge and a paraffined sweat band. The band can be made extensible for different sizes and the crown can be formed from a roll of paper and applied to the band to make the finished cap. The operation of the machine is such that two rolls of paper are used, one for the band and the other for the crown. The paper is folded and cut and the crown and band are brought together, all mechanically without being touched by the operator until the cap is completed.

The novel construction of the machine as well as the several stages of operation will all be described hereinafter, reference being had to the accompanying drawings in which:

Fig. 6 is a transverse section through the male and female creasing rolls on the line 6—6 of Fig. 2.

Fig. 7 is a reduced scale view of the band showing the crease lines which are wider at the following end to fold over the leading or inside end in the forming machine.

Fig. 8 is a side elevation of the folding and unfolding shoes.

Fig. 9 is a vertical section through the folding and unfolding forms on the line 9—9 of Fig. 8 to show the action of the formers on the paper.

Fig. 10 is a plan view of the cutting head and guide strippers.

Fig. 11 is a side elevation of the cutting head and the guide strippers.

Fig. 12 is a radial section through the winding drum showing a form mold and drive for winding drum. This illustrates the first stage of the forming process.

Fig. 13 is a radial section through the second stage of the forming process showing the mechanism for making the first fold in the band or brim.

Fig. 14 is a radial section through the third stage of the forming process where the second fold is made.

Fig. 15 is a partial vertical transverse section through the crown cutting head and a partial radial section through the mold, vacuum chamber and crown charging and third folding unit.

Fig. 16 is a radial section through the discharge stage showing the completed cap discharged from the mold.

Fig. 17 is a section through the completed cap.

Fig. 18 is a section through the band as it passes over the roller showing the band folded to get a good crease or fold.

Fig. 19 is a fragmentary plan view of the creasing rings to obtain the results shown on the band in Fig. 7.

Fig. 20 is a perspective view of one of the creasing arms shown on the band forming head in Figs. 13, 14, 15 and 22.

Fig. 21 is a perspective view of the band creasing and uncreasing guides shown in Figs. 8 and 9.

Fig. 22 is a radial section through the fifth stage of the forming process where the last or fourth fold is made.

Fig. 23 is a longitudinal sectional view through the valve sleeve.

Fig. 24 is an end view of the valve sleeve.

Fig. 25 is a sectional view on the line 25—25 of Fig. 23.

Fig. 26 is a sectional view taken on the two section lines 26—26 in Fig. 23.

Fig. 27 is a section on the line 27—27 of Fig. 23.

Fig. 28 is a side elevational view of the valve assembly.

Fig. 29 is a sectional view on the line 29—29 of Fig. 12.

In carrying out the invention, the paper for the band is fed from a roll, first to an embossing roll, where the paper is embossed to represent linen or other fabric material. It then passes to a printing mechanism where certain indicia can be printed thereon. From the printing mechanism the paper passes to paraffin and then creasing rolls. The band is then folded over at its edges to augment the creasing effect.

In the next step the creased edges are unfolded so the band material now lies flat. Then the band material is cut in length. The cut sheets are now intermittently wound on a drum to form a cylinder. In this form the cylindrical band is delivered into a mold in a turret, which is intermittently moved about its axis. The first fold of the band is now made, then the second fold is made, the crown is cut and delivered to the band; in the third fold the band is folded over the crown edge, then the fourth fold is made and the finished cap is ejected. These several operations will now be described.

Figure 4:
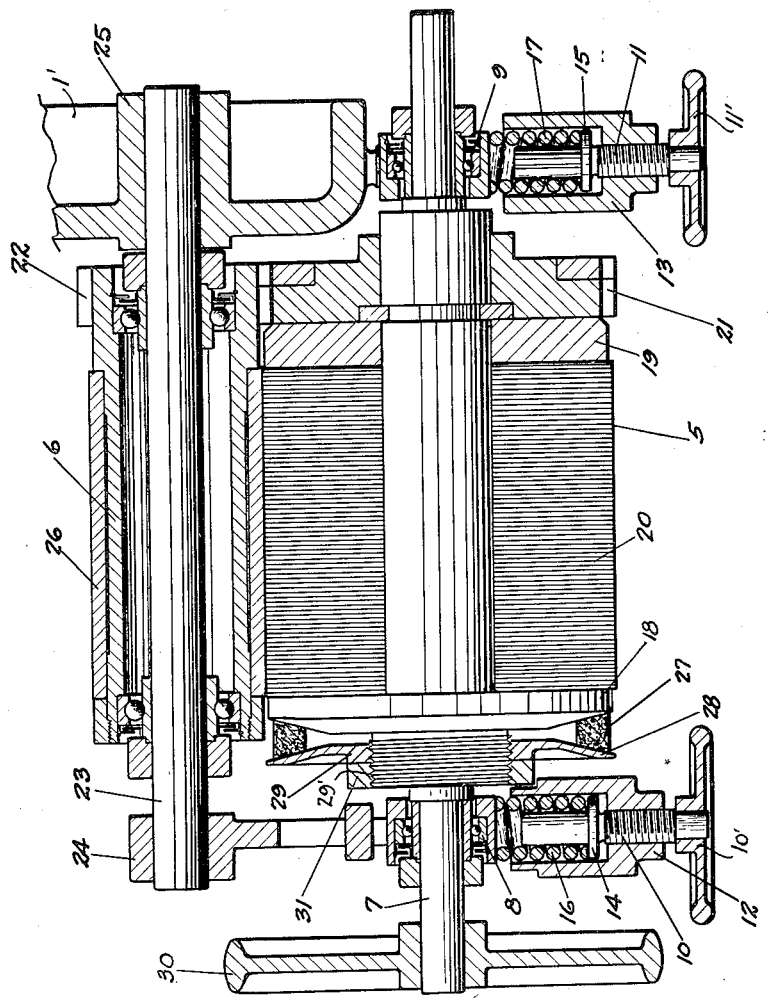
Fig. 4 is a vertical section through the embossing roll and paper matrix roll taken on line 4—4 of Fig. 2.

The main frame of the machine consists of three parts, 1, 1' and 2. On 1' is mounted chuck arbor 3, carrying a roll of paper 4. The paper for the band passes from roll 4 to the embossing rolls 5 and 6. The embossing rolls are best shown in Fig. 4. The roll 5 consists of a shaft 7, mounted in bearings 8 and 9 in the sides of the frame 1'. The bearings 8 and 9 are ball bearings and have springs 16 and 17 bearing against them. Through the medium of the springs 16 and 17, the adjusting wheels 10' and 11', connected to the adjusting screws 10 and 11 in the boxes 12 and 13 and the collars 14 and 15 between the adjusting screws and the springs, the tension between the embossing rolls is adjusted.

The shaft 7 of the roll 5 has head plates 18 and 19 between which is laminated material 20 and at one end of the roll is a gear 21 which meshes with the gear 22 on the embossing roll 6, carried by the shaft 23, mounted in fixed bearings 24 and 25. The embossing roll 6 carries a die 26 which cooperates with the soft laminated material 20 to emboss the paper. The roll 5 is driven by a belt 27 on the pulley 28. The paper is shortened by the embossing process. This necessitates driving the embossing rolls with a variable speed drive.

The pulley 28 has a nut portion 29 which can be turned in either direction on the threads 29' to vary the size of the groove formed by pulley portion 28 and plate 18. After the nut 29 is properly adjusted it can be locked in place by the jam nut 31.

Figure 2:
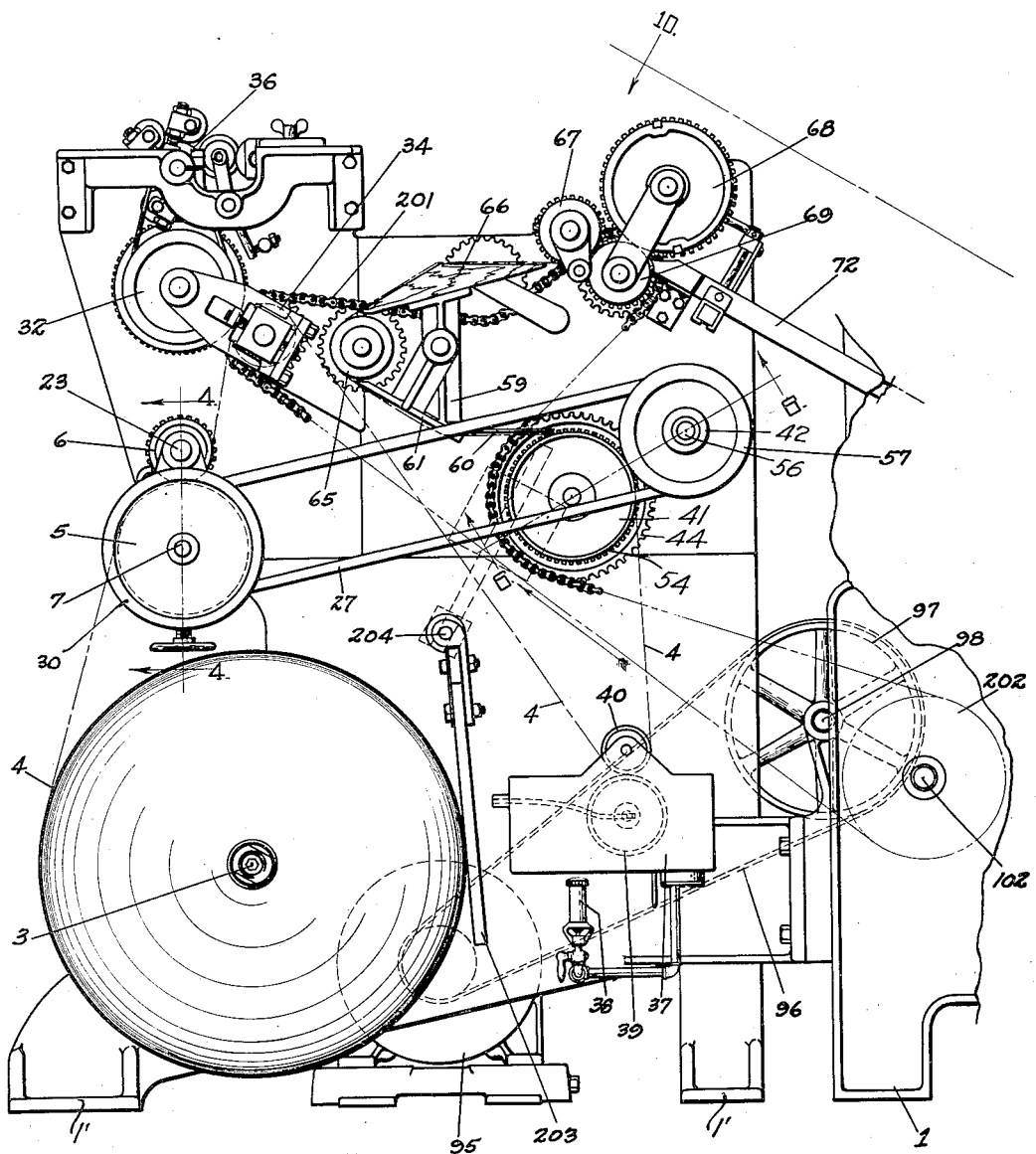
Fig. 2 is a side elevation of the band embossing, printing, paraffining, creasing, folding and cutting units.
Figure 5:
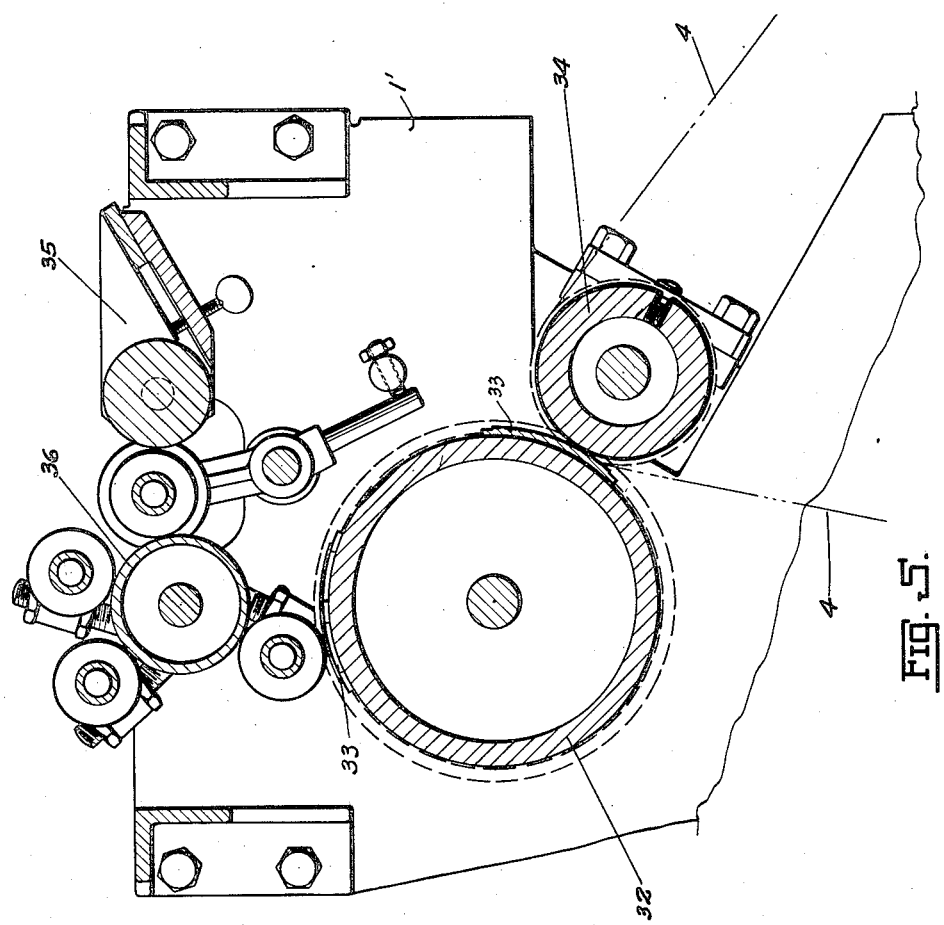
Fig. 5 is a transverse section through the form cylinder, platen cylinder, inking rolls and ink fountain taken on line 5—5 of Fig. 1.

After the paper is embossed it passes to the printing roll 32 which carries an electrotype 33 cooperating with the platen roll 34 to print the paper. The paper is indicated at 4, Fig. 5. The inking fountain 35 and inking rolls 36 may be of any form such as is used in printing presses to supply the electrotype 33 with ink. The paper passes from the printing roll to the paraffining mechanism 37 which consists of a reservoir with paraffin therein, heated by a burner 38. The receptacle 37 carries a spring supported roller 39 cooperating with a roller 40 in fixed bearings in the receptacle 37 so that as the paper passes between the rollers 39 and 40 a strip of paraffin is applied to the paper of sufficient width to paraffin the sweat band as will be described more in detail hereinafter. After leaving the paraffining mechanism the paper passes to the creasing rollers 41 and 42, (see Figs. 2 and 6). The female creasing roller 41 is mounted on a shaft 43 which carries a sprocket 44 and a cylinder 45. The female creasing roller 41 carries female creasing rings 46, 47, 48, and 49. These are circular and they cooperate with male scoring or creasing rings 50, 51, 52 and 53 on the male creasing roller 42. The female creasing roller 41 drives the male creasing roller 42 through gears 54 and 55 and the quill 56 for the male creasing roller 42 carries a pulley 57 which drives the embossing roll 5 through a belt 27. The pulley 57 with its nut portion 57' and the jam nut 31' forms a part of the variable speed drive to the embossing rolls. The nut portion 57' and jam nut 31' are adjusted in the same manner as the nut portion 29 and the jam nut 31 on the embossing roll 5 are adjusted.

As the paper passes between the rollers 41 and 42 it is scored as indicated at 46', 47', 48' and 49' in Fig. 7. This scoring is provided to give a primary fold or score to the paper 4 so that the edges will fold over easily and after the paper leaves the scoring rollers 41 and 42 it passes over a former plate shown in Figs. 8, 9, 18 and 21. It will be noted that the scoring knives 46, 47, 48, and 49 are very slightly spiral so that the scoring lines are slightly wider at the rear end than at the forward end of the length to form band. This is to permit the rear or following end to easily fold over the leading or inside end in the forming mechanism.

Adjacent to the scoring rolls is a bracket or brace 59 which carries a plate 60 adjacent to which are guides or folding shoes 61 and 62 so that the sides 63 and 64 (see Fig. 9) of the paper 4 will be folded up on the score lines and after the paper moves over the roller 65 it passes over an unfolding guide or head 66 so that when the paper leaves the head 66 it is again flat. The paper then passes under the roller 67 and between the rollers 68 and 69. The roller 68 carries a knife 70 which coincides with a groove 71 in the measuring roller 69 so that the paper can be cut into lengths at this point and then pass on to the chute or guide 72 having guide rails 73 and 74 which hold the advanced sheet true, through the medium of the linkage 75, 76, 77 and the arm 78. The link 76—78 is pivoted to a support at 76' and the links 75 and 77 are connected to the rails 73 and 74 at 79 and 80. A cam 81 moves the rails 73 and 74 to align the paper on the guide and to release it so that it can be wound true on the cylinder forming roll 82, which is in reality a mandril having a complementary roller 83'. The mandril 82 winds the flat sheet around it to form a cylinder using a vacuum to hold the sheet to the cylinder or mandril 82. The band is now in cylindrical form ready to be fed into the molds of the turret through the successive form operations to complete the cap. It should be stated here that the mandril drum has a hollow shaft 84 connected to an exhauster through the hollow support 85 and the opening 86 in the conduit 87. The conduit 87 is connected directly to the exhauster and when the mandril 82 moves into the mold 124 it carries the band held in place by vacuum until valve 84' strikes stop 119 which cuts off the vacuum and releases the band from mandril 82. At the same time valve 134 is opened and a vacuum holds the paper band to the sides of the mold in the turret. This will be explained more in detail hereinafter. The scored cylindrical band is now ready to be acted upon by the first folding head. The member 113 is reciprocated back and forth by the link 89 connected to the elbow lever 90 operated by the pitman 91 which is connected by a wrist pin 92 to the disc 93 on the shaft 94. The shaft 94 is driven through a series of gears by the motor 95 which has a belt drive 96 to drive the pulley 97 adapted to be clutched to the shaft 98 by the clutch 99. The clutch 99 may be thrown into and out of engagement by an appropriate hand lever or foot lever as the case may be. The shaft 98 carries a flywheel 98' and a gear 100 which drives a gear 101 on the shaft 102. The shaft 102 rotates the arm 103 for the Geneva motion which engages on the slots 104 of the Geneva wheel 105 to rotate the gear 106 on the shaft 107. The gear 106 meshes with the gear 108 on the turret 109 mounted in the frame. On shaft 102 is an intermittent gear 110 which meshes with the intermittent gear 111 to drive the shaft 94.

Figure 1:
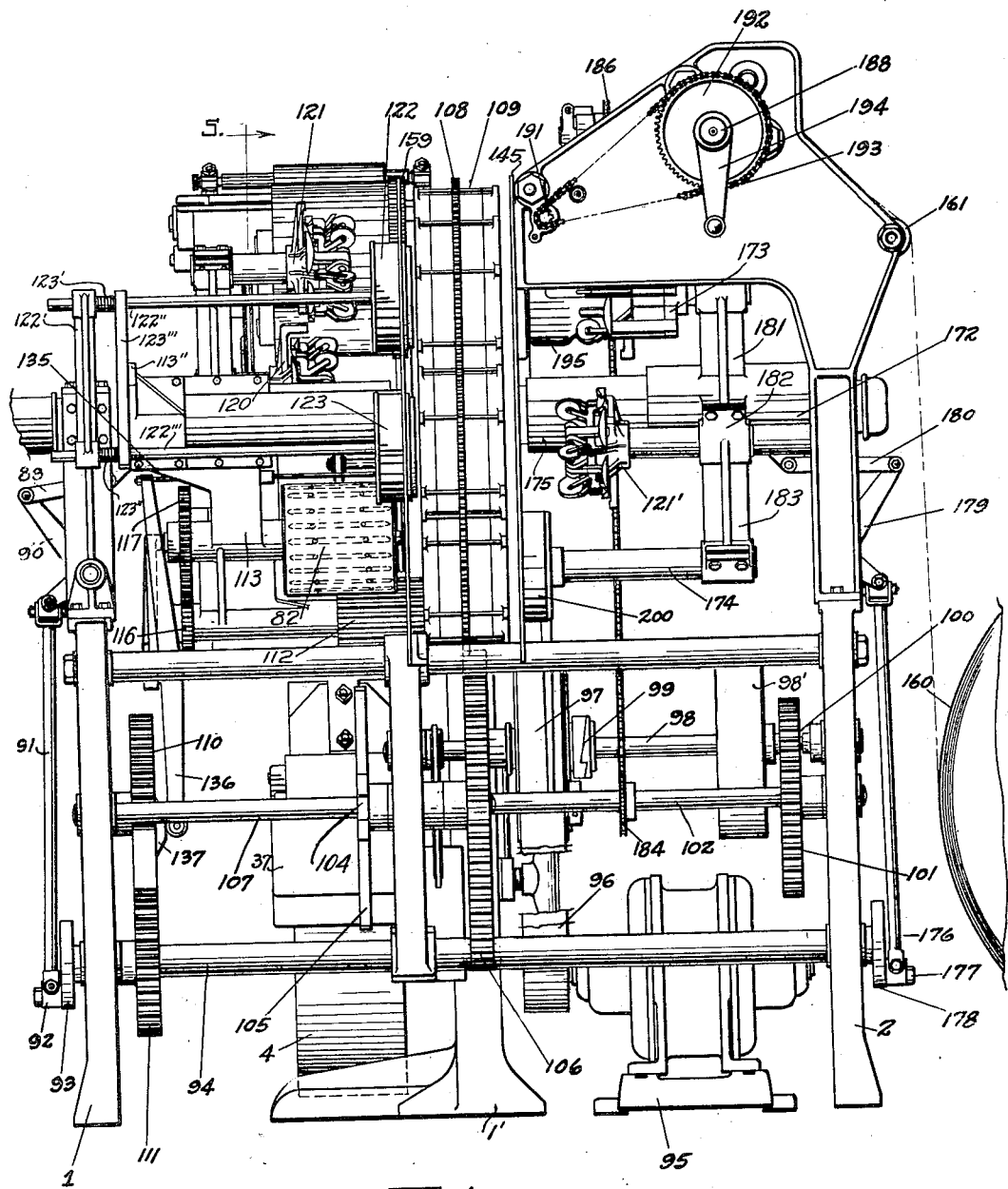
Fig. 1 is a front elevation of the machine looking at same from the discharge side.

The gear 108 meshes with the elongated toothed gear 112 carried by the head casting 113 and it drives a shaft 114 in the bearing 115. The shaft 114 carries a gear 116 which meshes with the gear 117 to rotate the hollow shaft 84 which drives the mandril 82. By referring to Fig. 12 it will be observed that there is a stop 118 to operate valve 84' in one direction and a stop 119 at the back side of the plate 145 to operate valve 84' in the other direction. The head 113 in addition to carrying the cylinder forming mandril roll also carries a head or paper forming and creasing member 120 to perform the first folding action, and another head 121 to perform the second folding action. A bracket 122' on main frame 1, carries sliding rods 122'' and 122''' on which are mounted the gauge heads 122 and 123. (See Fig. 1.) The heads 122 and 123 are moved into the molds by compression springs 123' and 123'', pressing against bar 123''' which is fastened to bars 122'' and 122'''. Mounted on head 113 is a retracting bracket 113'' for pushing the gauge heads 122 and 123 out of the molds 127 and 128 at the last part of the outward stroke of the head 113. These heads are received in corresponding forms or molds 124, 125, 126, 127 and 128. The band receiving form of mold 124 shown in Fig. 12 receives the band from the mandril 82 and it is provided with openings 131, 131', 132 and 132' at its respective ends which communicate with the chamber 133' of the valve sleeve 133. The chamber 133' is connected to the exhaust conduit 87. The ports or openings 131, 131', 132 and 132' are adapted to be closed or rendered ineffective by the valve 134 on the stem 135 connected to the rocker arm 136 (see Figs. 1 and 12) said rocker arm being actuated by a cam 137 on the gear 110 and also by the hub 113' striking the valve 134 on the inward stroke of the head casting 113. The valve operates to permit the exhauster to hold the band in the form 124 when the valve 134 is open and until the mandril 82 moves back to the position shown in Fig. 12. This is to prevent the mandril 82 from pulling the band back out of the form 124 and to insure the band being carried to the next stage to be acted upon by the first folding head 125.

It is to be understood that when the heads and the casting 113 and 172 reciprocate on the hollow conduit 87 and 175 that all of the forming members move with them and that the vacuum holds the band in the forming molds during the various operations of forming the cap.

After the band is introduced into the first mold and the mandril is retracted, the Geneva wheel moves the turret around one step so that the first head 120 is ready to make the first fold (see Fig. 13). The head 120 is mounted on a hollow shaft 138. It consists of a sliding block 139 having stops 140. The sliding block 139 is held on the hollow shaft 138 by a collar 141. A series of outstanding rollers 142 are carried by the head and about these rollers are fingers 143. As the head moves forward the fingers 143 engage the paper and together with the fingers 141' the first fold is made as shown in Fig. 13. As the head advances into the mold stops 140 contact with the stop plate 159 and the block 139, fingers 143 and pin 156 stop moving and are held in position by tension spring 157. Fingers 141' are kept in motion and finish the fold started by fingers 143. The yielding pin 156 in the slot 155 retracts the shaft 147 tilting the arms 148 of the creasing members 149 shown in Figs. 13 and 20 to crease the fold against the sides of the mold 125 to lay the fold flat. It will be noted that the creasing members (see Fig. 20) consist of arcuate heads 150 with right angular shanks 151 to which the arms 148 are connected and that the arms are pivoted at 152. The spring 153' in the cup like collar 146 is provided to prevent breaking of the creasing members 149 if paper or some other obstruction should come between the member 149 and the sides of the mold. The compression spring 153 rests against the collar 154 and exerts a pressure against the cup shaped collar 146' to retract the creasing member 149 on the return stroke or as soon as pin 156 leaves the end 155' of slot 155. The pin 156 is rigidly fastened to the sliding block 139 and passes through a slot in the hollow shaft and through the slot 155. The movement of block 139 when stops 140 strike stop plate 159 causes the pin 156 to move to back end of slot 155 where it becomes effective to operate the creasing members 149. Compression spring 157 returns the block 139 back to its original position ready for next cap.

Figure 3:
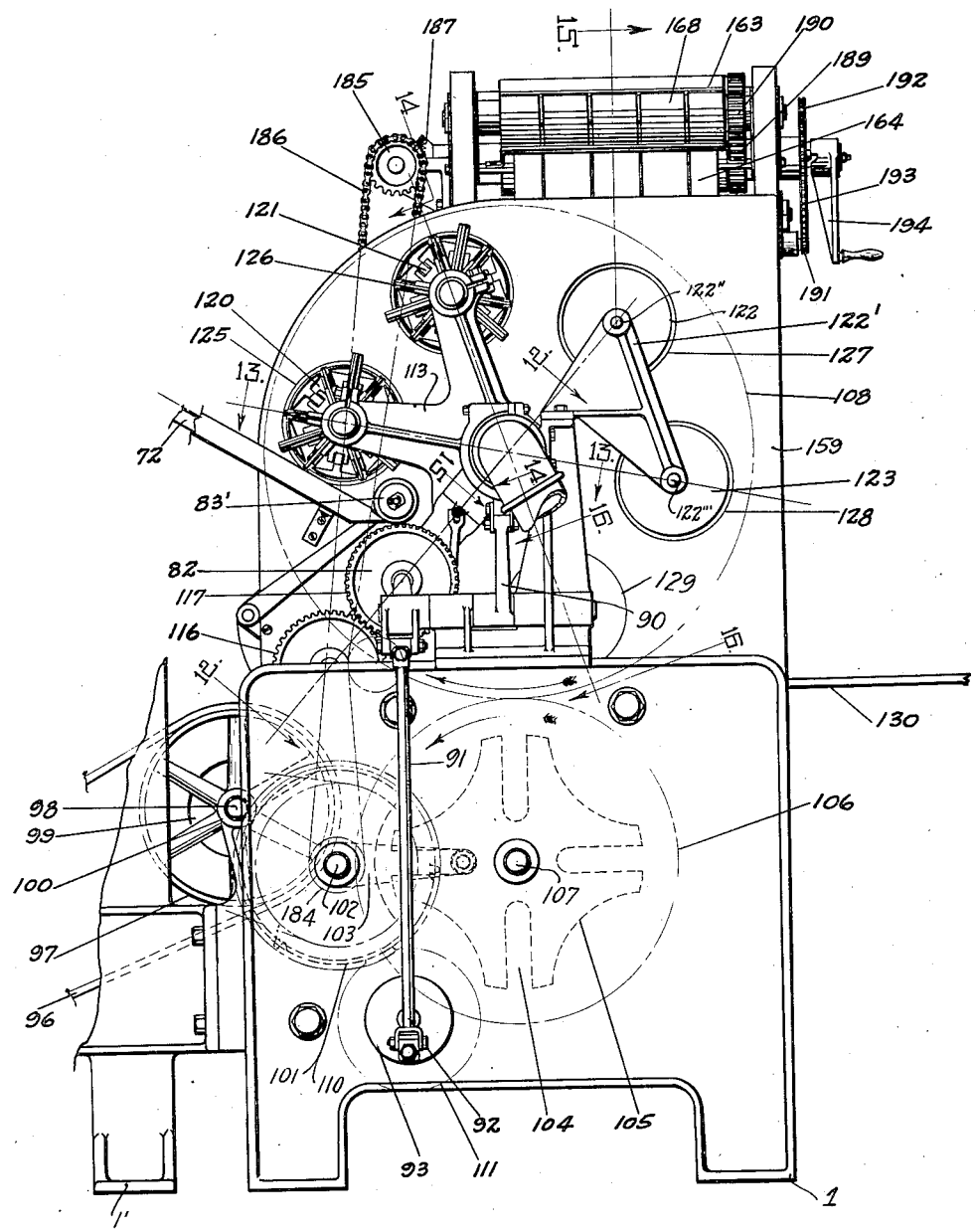
Fig. 3 is a side elevation of the cap forming unit.

After the first fold is made the heads 113 and 172 with the other heads are withdrawn from the molds. The Geneva motion now moves the turret one step so that the band which has been acted upon to make the first fold is carried opposite the head 121 which can now move into the mold to make the second fold as shown in Fig. 14. The cut band 4' is now in the mold and the second fold is made. The head 121 corresponds in detail to the head 120 except that the stop member 140 is shorter allowing the head 121 to go farther into the mold. Since the construction of the heads are practically the same, corresponding numbers have been given the corresponding parts on all heads so as to shorten the description. After the second fold has been made the top band portion of the cap has been completed. The mold now moves to the fourth stage, that is, the crown-applying stage, where the crown is applied and the third fold is made. The paper for the crown is fed from a roll 160 up to the idler 161, under the friction roller 162, between the cutting rollers 163 and 164 where the paper is severed into lengths due to the fact that the knife 165 on roller 163 coincides with a groove 166 on the roller 164. The severed paper is fed down the guide or chute 167 from between the rollers 164 and 168 to the rollers 169 and 170, across the flared ring 171 where it is introduced into the back side or rear side of the mold. In order to effect the introduction of the crown sheet into the mold, a sliding bracket head 172 is provided, similar to the head 113. It carries a crown sheet introducing head 195, a folding and creasing head 121, and an ejector head 200 in proper spaced relation. The bracket head 172 is supported on a tubular support 175 and it is reciprocated through the medium of the pitman 176 connected to the wrist pin 177 on disc 178 on shaft 94 which operates the elbow lever 179, driving a link 180 connected to bracket head 172. The arms 181, 182 and 183 carry the members 195, 121' and 174 in radial spaced relation so that they are in position to function with the respective molds. The sprocket 184 on shaft 102 drives a sprocket 185 through the chain 186 (see Fig. 3) which, through a bevel gear 187 drives shaft 188 on which roller 164 is mounted. The cutting roller 163 is driven from shaft 188 through the gears 189 and 190. The roller 170 is driven from shaft 188 through the sprockets 191 and 192 connected by chain 193 (see Fig. 1) and shaft 188 has a crank 194 by means of which the feed rollers can be turned by hand for initially feeding in the crown sheet paper and in order to permit this the drive from the main machine can be thrown out by a clutch of appropriate construction not shown. When the bracket head 172 is moved toward the center of the mold a crown introducing band 195 on head 173 (see Fig. 15) forces the sheet into the band already in the mold so that the crown 196 is within the band and the head 173 which corresponds to the head shown in Fig. 14 folds over the rear edge of the band so that the free edge of the crown is received in a fold in the rear edge of the band. As the bracket 172 recedes from the mold the Geneva motion advances the mold to a position opposite the head 121', see Fig. 22, the head 121' corresponding to head shown in Fig. 14, makes the second crown securing fold so that the cap is now formed as shown in Fig. 17.

It will be noted that the gauge heads 122 and 123 prevent the heads 121' and 173 from pushing the band out of the mold when the crown is being inserted. (See Figs. 1 and 15.) The movements of the heads on the brackets 113, 122' and 172 are synchronized so that they will move into and out of the molds in proper co-relation. After the cap is formed so that the rear edge of the band has a double fold over the free edge of the crown 196 with the band 199 fast to it as shown in Fig. 17, the cap is ready to be ejected from the mold 129. This is effected by the ejector plunger 174 having a head 200 which is introduced from the rear of the mold to eject the finished cap out upon the table 130. The ejected cap is round and it may now be collected and pressed flat ready for packing.

The second and fourth operation shown in Figs. 13 and 15 are identical except that one is on one side of the turret and the other is on the opposite side and that in the fourth operation the head 172 carries the crown introducing band 195 to push the crown in place and instead of the element 141' in Fig. 13 the element 173 is used in Fig. 15 for the fourth operation. The third and fifth operations are identical as shown in Figs. 14 and 22 except the mechanism for the fifth operation is on the opposite side of the turret with respect to the mechanism for the third operation.

The second, third, fourth and fifth operations are very similar so far as parts and function are concerned and attention is called to the fact that the fingers 143 bend the part of band to be folded toward the center about 45 degrees to hold the part of the band to be folded in this position while the parts 141' and 173 continue on carrying the part to be folded to cause it to lie flat against the mold or matrix. Then the part 149 presses the fold flat, the rollers 142 at this time being of asistance in rolling the folds and crown down preliminary to completing the fold.

In describing the invention we have attempted to carry through the operation from the beginning to the end of the cap manufacture, under the assumption that the band is first introduced into the mold 124 and that the various steps are progressively carried out through that particular mold in order to show the sequence of operation but it is to be understood that the molds 124 to 129, both inclusive, are all duplicates and that there is one operation taking place in each mold simultaneously with different operations in the remaining molds so that when the machine is operating some stage of cap manufacture is taking place in each of the six molds or cylinders in the turret so that every time the bracket heads 113 and 172 operate through a cycle a finished cap is being ejected from the mold or cylinder 129.

From the foregoing it will be aparent that two rolls of paper, one for the band and one for the crown, will be fed through the machine, cut and folded in proper stepped relation so that a finished cap can be mechanically manufactured therefrom. The creasing, printing, cutting and feeding rollers for the band can be driven by a chain 201 which is driven from the sprocket 202, keyed to shaft 102 (see Fig. 2). Any other form of drive, however, may be substituted. The friction plate 203 pivoted at 204 (Fig. 2) rests against the roll 4 to hold the paper against slack.

It is to be noted that the valve sleeve 133 is stationary and acts as a journal for gear hub 108' and that the gear hub 108' is a part of the valve as well as a bearing for the turret.

It is to be further noted that there are six steps in the turret process as follows; charging, first fold, second fold, crown charging or third fold, fourth or final fold and discharge by the ejector through opening in plate 159 to the table. The reference numerals 205, 206, 207 and 208 designate annular chambers in all of the molds of which there are six in number all mounted on gear 108 and gear hub 108'. These chambers communicate with segmental grooves 131, 131', 132 and 132' through holes 131'', 131''', 132'' and 132''' as shown in Fig. 29. 209, 210, 211 and 212 are valve ports leading from annular chambers 205, 206, 207 and 208 to the chamber 133' of valve sleeve 133. The valve sleeve 133 is provided with segmental grooves 213, 214, 215 and 216 which have perforated walls to communicate with the vacuum chamber 133'. When the parts are in the position shown in Fig. 12, station # 1, all annular spaces 205, 206, 207 and 208 are closed off from the chamber 133' by the valve 134. When the mandril 82 moves into the mold 124 the hub 113' strikes valve 134, opening it and at the same time valve 84' is closed by the end striking against stop 119. This step transfers a cylindrical sheet of paper from the mandril 82 to the mold 124. When the parts are in the position shown in Fig. 13, station #2, all the grooves are under vacuum. When the parts are in the position shown in Fig. 14, station #3, the annular space or chamber 205 is closed off from vacuum chamber 133' of sleeve 133 and at station #4, Fig. 15 the same condition prevails. Station No. 5 is shown in Fig. 22 and it will be noted that the annular spaces 205 and 208 are closed off from vacuum chamber 133'.

When the parts are in the position shown in Fig. 16, station #6, all the annular spaces are closed off so that the hat can be ejected. The closing of the different annular spaces is due to the fact that the segmental grooves in the valve sleeve or member 133 are of different lengths or areas as will be apparent by reference to Figs. 25, 26 and 27.

Various changes in form, proportion and minor details of construction may be resorted to without departing from the spirit of the invention or sacrificing any of the invention thereof so we do not wish to be limited to the precise construction shown but reserve the right to make changes in form, proportion and details of construction which properly come within the scope of the claims.

What we claim and desire to secure by Letters Patent is:

1. A cap forming machine comprising a material feeding mechanism, means for forming the ends of the material into an endless band, mechanical means for folding over the longitudinal edge of the band thus formed to form a sweat band, means for feeding a crown sheet into close proximity with the band and means for folding over the edges of the band to engage the crown sheet to complete the cap.

2. A cap forming machine comprising means for holding a roll of paper to be fed through the machine, mechanism for embossing the paper, means for printing the paper, means for applying moisture resisting material to the paper, means for scoring the paper, means for cutting the paper into sheets, means for forming the cut sheet into a cylinder, a mold to receive the cylinder, means for advancing the cylinder to the mold, edge folding mechanism to act on the cylinder to form a sweat band, a second paper roll holder to contain a roll of paper to be advanced through a portion of the machine, means for cutting the paper into sheets, means for advancing a sheet into the cylinder, means for attaching the sheet to the cylinder to form a crown to provide a cap and means for ejecting the cap.

3. A cap forming machine comprising a material roll holder, mechanism for cutting the material from the roll into sheets, means for forming the sheets into cylinders, means for holding the cylinders, means for removing the cylinder from the cylinder forming means, means for folding over one edge of the cylinder to stiffen the same and secure the ends of the sheet together, means for delivering crown sheets to the inside of the cylinder, means for folding over the other edge of the cylinder in inter-folding relation with the free edge of the crown sheet to form a cap.

4. In a cap forming machine, a support for a roll of material, and embossing mechanism for the material, means for applying paraffin to the material, scoring means, means for folding over the edges of the material at the scored lines, means for subsequently unfolding the material, a guide over which the material passes, means for cutting the material in sheets, a cylinder forming mandril, a turret having molds facing the mandril, said molds having suction openings, means for advancing the mandril into and out of the molds, means for intermittently rendering the suction openings effective and ineffective, edge folding mechanism cooperating with the molds, crown sheet advancing mechanism for advancing crown sheets into the cylinders and means for connecting the crown sheet to the cylinders.

5. In a cap forming machine, a support for a roll of material, and embossing mechanism for the material, means for applying paraffin to the material, scoring means, means for folding over the edges of the material at the scored lines, means for subsequently unfolding the material, a guide over which the material passes, means for cutting the material into sheets, a cylinder forming mandril, a turret having molds facing the mandril, said molds having suction openings, means for advancing the mandril into and out of the molds, means for intermittently rendering the suction openings effective and ineffective, edge folding mechanism cooperating with the molds, crown sheet advancing mechanism for advancing crown sheets into the cylinders and means for connecting the crown sheet to the cylinder, said means comprising edge folding devices.

6. In a cap forming machine means for advancing a strip of material through the machine, cutting rolls for cutting the strip into sheets, a guide chute for the sheets, means for centering the sheets on the chute, a cylinder forming roll at the end of the chute, a suction nozzle adjacent to the roll, a traveling mold into which the paper on the roll may be delivered, means for folding the edges of the cylindrical sheet to stiffen the same, means for feeding a crown sheet into the cylinder, means for interfolding the edge of the crown sheet and the cylinder to form a cap and means for ejecting the finished cap from the machine.

7. A cap forming machine comprising a cylinder forming roll, means for feeding sheets of material to the roll, a traveling mold to receive the cylindrical sheet, means for advancing the roll into the mold and for retracting it therefrom, suction means for holding the cylinder in the mold, a plurality of folding mechanisms in line with the line of travel of the mold, means for advancing the folding mechanisms into operative engagement with a cylindrical sheet, a crown feeding mechanism in line with the line of travel of the mold, means for advancing the crown sheet into the cylinder in the mold, means for securing the crown sheet to the cylinder and means for ejecting the finished product from the mold.

8. A cap forming machine comprising means for feeding sheet material of predetermined lengths, a drum on which said sheet material is wound into cylindrical form, a hollow mold into which the cylindrically formed sheet is delivered from said drum for support against the inner wall thereof, means for feeding a crown sheet into said mold in close proximity with the cylindrically formed sheet, and means for attaching the cylindrically formed sheet and crown sheet together within said mold.

9. A cap forming machine comprising means for feeding sheet material of predetermined lengths, a movable drum on which said sheet material is wound into cylindrical form, a hollow mold for receiving said movable drum and into which the cylindrically formed sheet is delivered from said drum for support against the inner walls thereof, means for feeding a crown sheet into said mold in close proximity with the cylindrically formed sheet, and means for attaching the cylindrically formed sheet and crown sheet together within said mold.

10. A cap forming machine comprising means for feeding sheet material of predetermined lengths, an axially movable drum on which said sheet material is wound into cylindrical form, a hollow mold into which said drum is moved to deposit the cylindrically formed sheet, suction means for holding said sheet against the inner wall of said drum, means for feeding a crown sheet into close proximity with the cylindrically formed sheet, and means for attaching the cylindrically formed sheet and crown sheet together.

11. A cap forming machine comprising means for feeding sheet material of predetermined lengths, a drum on which said sheet material is wound into cylindrical form, suction means for holding said sheet material in cylindrical form on said drum, a hollow mold into which the cylindrically formed sheet is delivered from said drum, suction means for holding said cylindrically formed sheet against the inner wall of said mold, means for feeding a crown sheet into close proximity with the cylindrically formed sheet, and means for attaching the cylindrically formed sheet and crown sheet together.

12. A cap forming machine comprising means for feeding sheet material of predetermined lengths, a movable drum on which said sheet material is wound into cylindrical form, a turret intermittently movable about its axis, a plurality of hollow molds on said turret for receiving said movable drum and into which the cylindrically formed sheet is delivered from said drum for support against the inner wall thereof, means for feeding a crown sheet into said mold in close proximity with the cylindrically formed sheet, and means for attaching the cylindrically formed sheet and crown sheet together within said mold.

13. A cap forming machine comprising means for feeding sheet material of predetermined lengths, an axially movable drum on which said sheet material is wound into cylindrical form, a turret intermittently movable about its axis into a plurality of stations, a plurality of hollow molds on said turret into which said drum is moved at one of said stations to deposit the cylindrically formed sheet, means for holding said sheet against the inner wall of said drum, means at a succeeding station for folding a longitudinal edge of said sheet, means at a further succeeding station for feeding a crown sheet into close proximity with the cylindrically formed sheet, and means at a final station for attaching the cylindrically formed sheet and crown sheet together.

14. A cap forming machine comprising means for feeding sheet material of predetermined lengths, an axially movable drum on which said sheet material is wound into cylindrical form, a hollow mold into which the cylindrically formed sheet is delivered on said drum, means for removing said sheet from said drum, means for folding a longitudinal edge of said sheet, means for feeding a crown sheet into close proximity with the folded edge of said sheet, and means for attaching the folded edge and crown sheet together.

15. A cap forming machine comprising means for feeding sheet material of predetermined lengths, a movable drum on which said sheet material is wound into cylindrical form, a turret intermittently movable into a plurality of stations, a plurality of hollow molds on said turret for receiving said movable drum and into which the cylindrically formed sheet is delivered from said drum, said molds having suction openings for securing said sheet, means for intermittently rendering said suction openings effective and ineffective, means for feeding a crown sheet into close proximity with the cylindrically formed sheet, and means for attaching the cylindrically formed sheet and crown sheet together.

16. A cap forming machine comprising means for feeding sheet material of predetermined lengths, an axially movable drum on which said sheet material is wound into cylindrical form, a hollow mold into which said drum is moved to deposit the cylindrically formed sheet, suction openings for holding said sheet against the walls of said drum, means for intermittently rendering said suction openings effective and ineffective, edge folding mechanism cooperating with said mold to fold a longitudinal edge of said sheet, means for feeding a crown sheet into close proximity with the folded edge of said sheet, and means for attaching the folded edge and crown sheet together.

GLENN A. SHAFFER.
FRANKLIN H. WIRTZ.